Apr. 3, 1923.

J. W. CROWLEY, JR
CLUTCH
Filed June 25, 1919

Inventor
John W. Crowley, Jr.
Foneé Bain
Attys.

Apr. 3, 1923.

J. W. CROWLEY, JR
CLUTCH
Filed June 25, 1919

Inventor
John W. Crowley, Jr.
Foree Bain
Attys:

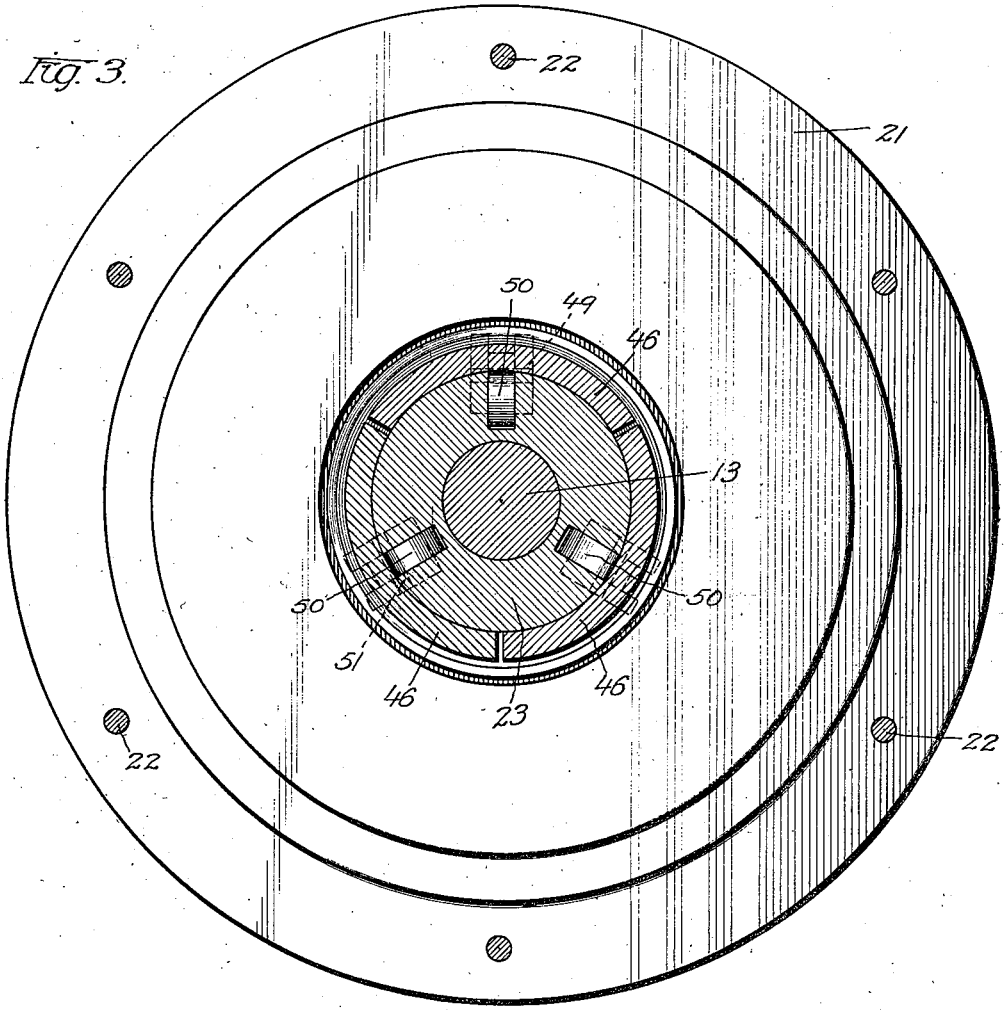
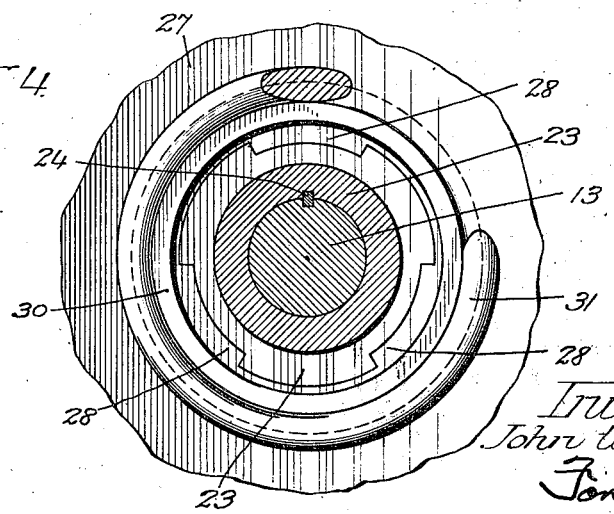

Apr. 3, 1923. 1,450,202
J. W. CROWLEY, JR
CLUTCH
Filed June 25, 1919 4 sheets-sheet 4
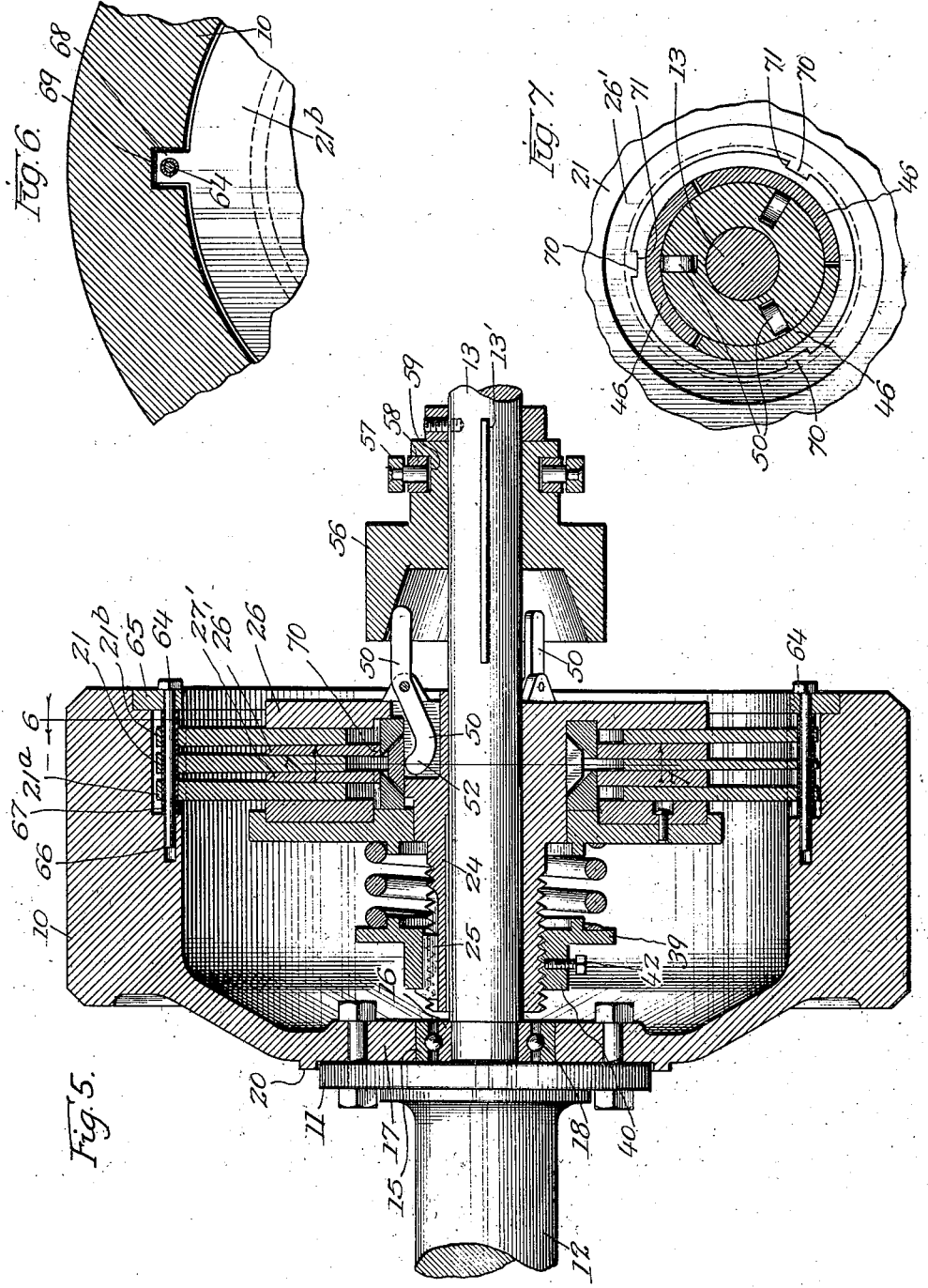

Patented Apr. 3, 1923.

1,450,202

UNITED STATES PATENT OFFICE.

JOHN W. CROWLEY, JR., OF CHICAGO, ILLINOIS.

CLUTCH.

Application filed June 25, 1919. Serial No. 306,607.

*To all whom it may concern:*

Be it known that I, JOHN W. CROWLEY, Jr., a citizen of the United States, residing at Chicago, in the county of Cook and State of Illinois, have invented certain new and useful Improvements in Clutches, of which the following is a specification.

The invention relates to improvements in clutches.

One of the objects of the invention is to provide a clutch especially adapted for connecting an engine to its load, as in self propelled vehicles, in which the clutch members, on the shaft to be driven, are moved axially in opposite directions from the axially fixed member on the driving shaft, so as to prevent drag, by contact of the members, when the clutch is open and the engine is in motion.

Another object of the invention is to provide clutch-engaging members that are yieldingly held in contact, when released from the positively operated separating means, and means subsequently to increase their adherence, by effect of the relative rotation of the members.

Another object is to provide a clutch in which the clutching members are adjustably spring-pressed into driving engagement to an extent to transmit a given torque and in which excessive torque resistance to the driven member operates to increase the driving engagement to a predetermined extent, after which the further relative rotation of the members, by failure to overcome the excessive torque resistance, operates to decrease the driving engagement of the members, thus introducing an element of safety between the driving and driven instrumentalities to provide against undue strain and danger of fracture when a positive resistance to rotation is encountered.

Other, further and more specific objects of my invention will become readily apparent, to persons skilled in the art from a consideration of the following description when taken in conjunction with the drawings, wherein:—

Fig. 3 is a transverse section taken on line 3—3 of Fig. 1.

Fig. 4 is a transverse section taken on line 4—4 of Fig. 1.

Fig. 5 is a section similar to Fig. 2 showing a slight modification.

Fig. 6 is a fragmentary section taken on line 6—6 of Fig. 5.

Fig. 7 is a transverse section taken on line 7—7 of Fig. 5.

In all the views the same reference characters are employed to indicate similar parts.

Figures 1, 8:
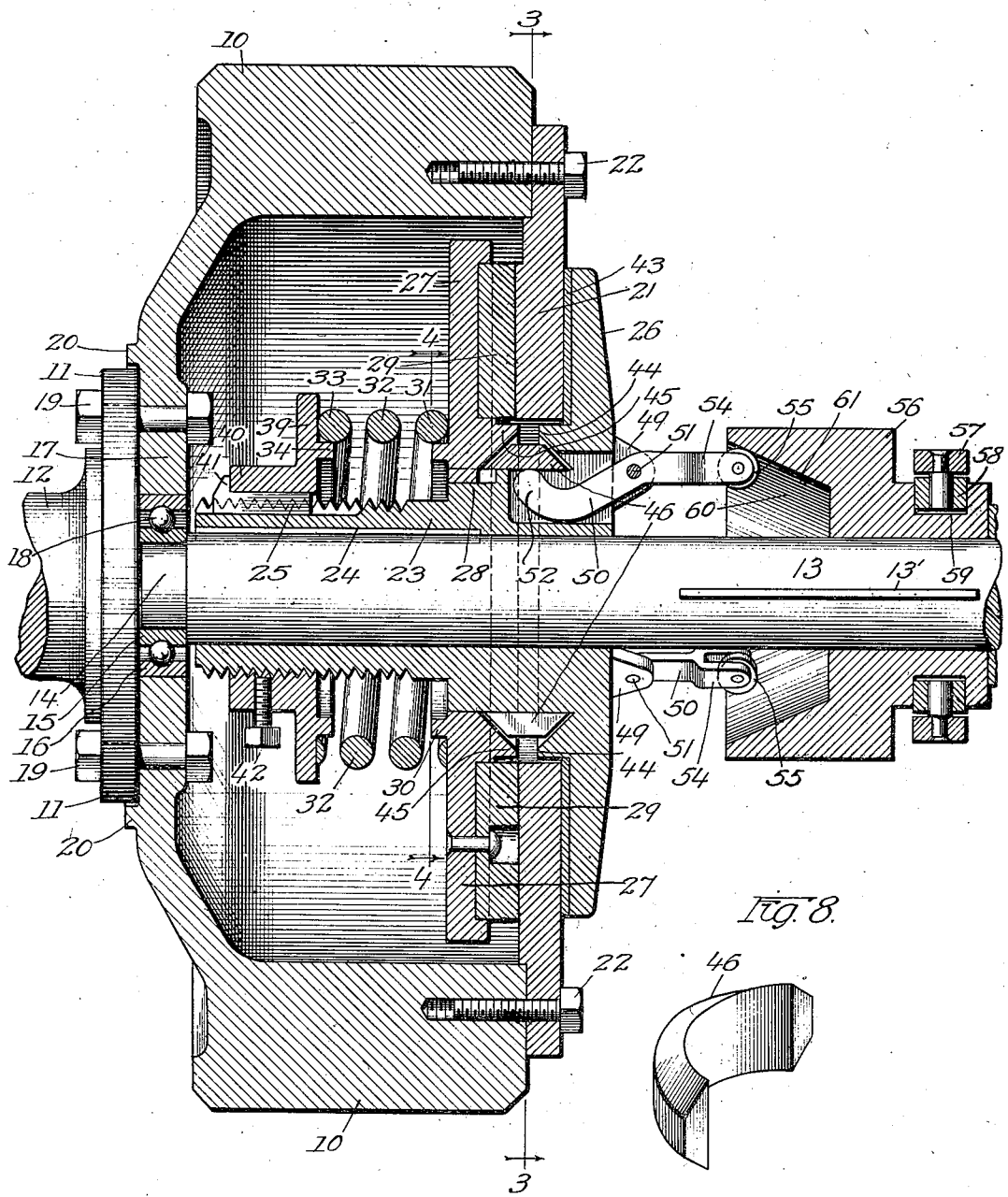
Fig. 1 is an exemplification of one embodiment of the invention, showing the clutch in section and the clutch members in driving engagement.
Fig. 8 is a perspective view of a detail.

In the embodiment of the invention, as exemplified by the drawings, the clutch is designed to be attached to a fly wheel 10 that is supported by a flange 11 on the engine crank shaft 12. In this situation the fly wheel 10 is the driver and the shaft 13 is the driven member. The inner end of the shaft, as at 14, is slightly reduced for a ball-bearing member 15, that cooperates with a similar member 16 which is located in the web 17 of the fly wheel; the usual intervening balls 18 completing the ball bearing connection. The web 17 is secured to the flange 11, as by bolts 19. By this arrangement the shafts 12 and 13 are relatively and independently rotatable and are maintained in perfect axial alignment. An annular projection 20 may be made on the outer surface of the web 17, to center the flange 11 therein, for the purpose of locating the parts in proper alignment, and for preventing them from shifting and for reinforcing the bolts 19 after they have been inserted and secured in place.

Figure 2:
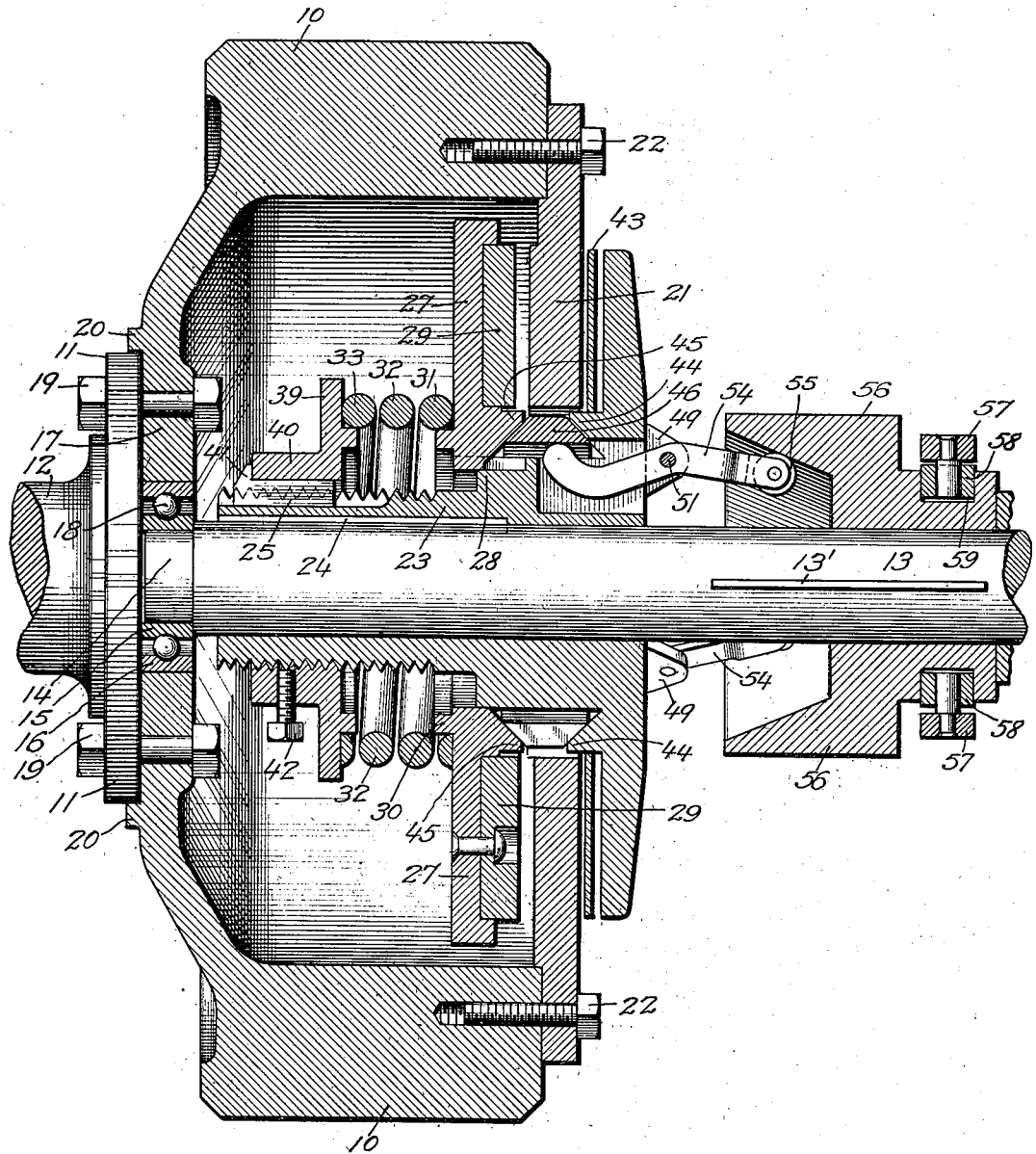
Fig. 2 is a similar view, showing the clutch members disengaged, so that they are separately rotatable.

In Figs. 1 and 2, a flat ring 21, is one of the clutch members, which is connected as by bolts 22 to the driving fly-wheel 10. A sleeve 23 is secured to the driven shaft 13, as by a spline and feather 24 and is screw threaded on its smaller end, as at 25. On the opposite end it is expanded into a disc or flat ring 26, which is another clutch member and in a generally parallel plane with the member 21, on the fly wheel 10. A flat ring 27 is axially movable on the shoulder 28 provided by the sleeve 23, and is another clutch member or may carry the clutch member 29, that bears upon the opposite side of the flat ring 21, with which it is adapted to be pressed into driving engagement. The ring 29 may be an integral part of the ring 27 or it may be an insert of suitable material having, preferably, a high coefficient of friction, of yielding nature, and it may, or may not, be rotatably fixed to the ring 27. The ring 27 carries an annular rim 30, for supporting one end 31 of the compression spring 32. The other end 33 of the spring 32 is supported on a similar annular projection 34, that extends laterally from the flange 39, carried by the nut 40, and thus the spring is supported between the members 39 and 27. The nut 40 is threaded upon the part 25, of the sleeve 23, and is axially movable thereon to vary the tension of the spring 32, and may be fixed in an adjusted position by any suitable means, for instance, as by a key 41, and a set screw 42, both or either. The office of the spring 32 is to draw the driven member 26 into driving engagement with the driving member 21 and to push the driven member 29 into driving engagement with the member 21, on its opposite side. Between the clutch member 26 and the member 21 I may place a floating steel flat ring 43, for the purpose of causing a more gradual "pickup" between the driving and driven members, as will be hereinafter more fully explained.

The member 26 and the member 27 each carry inwardly projecting annular tapered members 44 and 45, respectively, and lying between these members, 44 and 45, is a three-piece tapered wedge or composite ring 46, shown in perspective in Fig. 8, adapted when moved radially, from the position shown in Fig. 1, to the position shown in Fig. 2, to separate the clutch members, so that the driving and the driven members may be separately rotatable without material contact.

Spaced apart around the member 26, at suitable distances, are a plurality of pairs of ears 49 within each pair of which is pivoted a lever 50, as at 51. The inner end 52 of the lever is preferably curved and the out-turned curved end bears upon the respective sections 46, of the tapering ring. The outer end 54 of the lever 50 preferably carries a roller 55 and when the three levers 50 have their outer ends pressed radially inwardly toward the axis of the shaft 13 the inner ends 52 will press the respective segments of the ring 46 into contact engagement with the projections 44 and 45 on the driven clutch members 26 and 27, and separate them from the driving member. The member 26 and the sleeve 23 are thus moved axially, in one direction and the member 27 is moved in the opposite direction; both movements being resiliently opposed by the spring 32, as more clearly shown in Fig. 2.

A clutch operating member 56 is slidable on the shaft 13 by means of a fork and lever 57, which carries rollers 58 that are placed in the groove 59, as usual in such structures. The other end of the slidable member 56 is provided with a cavity 60 having an inclined inwardly converging surface 61, against which the rollers 55 engage when the member 56 is moved axially of the shaft 13 toward and from the clutch. When the member 56 is moved toward the clutch the outer ends 54 of the levers 50, are depressed and the inner ends 52 are moved outwardly and with them they each carry a segment of the ring 46, the tapering or wedging surface of which engages the tapering surface of the projections 44 and 45 of the clutch members 26 and 27 and separates them to a sufficient extent to prevent contact with the driving clutch member 21, so that in opening and closing the clutch, the member 21 is rigidly fixed and not moved, whereas the cooperating clutch members 26 and 27 are materially moved a substantially equal distance away from member 21 by the mechanism, and means described.

The ring 21 may be transversely tapered on one or both sides, the surfaces of which may be in one transverse plane less than 90 degrees from its axis, that is to say, it may be thicker at one edge than it is at the diametric opposite edge and the corresponding clutch members 26 and 27 may be similarly tapered so that if the clutch members are brought into driving engagement with each other, and the thicker side of one and the thinner side of the other are, at that time, in the same axial plane, a relative rotation of the members will cause the thicker portions of the clutching members, to be brought into approximately the same plane, thereby increasing the tension of the spring 32, by moving it into more contracted axial dimensions and causing the clutch to transmit the desired amount of power, or to overcome a predetermined torque resistance. Now if the torque resistance should become greater under such conditions, then the thicker portions of the members 26, 27 and 21 would become again rotatively displaced and the transmitting power of the clutch thus automatically diminished by thus decreasing the tension of the spring until the thicker portions of the clutch members are again brought in the same axial planes, whereupon the maximum capacity, due to the tension of the spring 32 is re-established, and so, if the shaft 13 should meet with a positive resistance, that could not be overcome within the safety limits of the power transmitting means, then these members would intermittently continue to be rotatively displaced even when the shaft 13 is entirely prevented from being rotated.

The steel plate 43 may be used, when desired, for the purpose of causing a more gradual "pickup" in starting. At the time when the ring segments 46, are being withdrawn from contact with the members 26 and 27, and before the spring 32 has exerted its full force to draw the driven members into contact with the driving member, there is a rotative movement between the ring 43 and the member 26 to compensate, to some extent, for the difference in the speed of the member 21 and the members 26 and 27, at the time that the speed members are being brought into engagement so that the latter members may be more gradually brought up to speed. When the wedge ring segments 46 are entirely withdrawn from engagement with the parts 44 and 45, of the clutch members 26 and 27, in the act of closing the clutch, then the spring forcibly brings the clutch members together and the plate 43 no longer has any function for the purpose described.

This plate 43 is not essential to the operation of the clutch. It is only a refinement that enables the members to be more gradually brought into driving association.

In Fig. 5 I have shown a similar arrangement, to that depicted by Figs. 1 and 2, with the exception that there are a plurality of alternately arranged clutch members on the driving and the driven members, respectively. The driven members 26 and 27 each have another member 26′ and 27′ alternating with the driving members 21, 21ª and 21ᵇ. The members 21, 21ª and 21ᵇ are slidable upon a bolt 64 that is passed thru a ring 65, and into the body of the fly wheel 10, as at 66. The bolt carries a spacing tube 67 upon which the clutch members 21, 21ª and 21ᵇ are axially movable. Each of the driving members has a driving part or radial projection 68 that extends into a depression 69 made in the fly wheel 10, so that they are thereby positively driven by the fly wheel. This is more clearly shown in Fig. 6, and the members 26′ and 27′ are each provided with projections 70 that extend into depressions 71 provided above the parts 44 and 45, of the respective members 26 and 27, so that the members 26′ and 27′ will thereby be positively driven with the members 26 and 27. The members 26 and 26′ and 27 and 27′ or any number of them, may be tapered, to a greater or less extent, for the purpose of increasing their frictional engagement by the relative rotation of the members after the clutch members have been brought into contact, as hereinbefore more fully explained.

In this expression of my invention, as exemplified in Fig. 5, the clutching members 26—26′ and 27—27′ and the members 21, 21ª and 21ᵇ will automatically adjust themselves to their respective positions during the engaging and disengaging operation. The plurality of discs, shown in Fig. 5, presents larger frictional surfaces of contact engagement of the clutching members and thus the adhesive effect is distributed over relatively large areas.

A very small degree of taper of the clutching members will accomplish the object desired, in some examples, not more than five-thousandths of an inch, and discs that are of uniform thickness will perform the functions described, but not to the extent that it may be accomplished when the discs or clutching members are properly tapered.

While I have herein shown a single embodiment of my invention, and one variation thereof, it will be manifest, to persons skilled in the art, that there may be other variations within the concept of the invention and that the invention is susceptible of other modifications within the scope of the appended claims.

Having described my invention, what I claim is:—

1. A clutch having in combinative association a flat ring clutch member; two axially movable members, one on each side thereof; a spring to normally hold said members in driving engagement and a radially movable wedge-shaped tapered ring segment, to move said outer members out of driving engagement with the intermediate member; a lever having a part inside the ring segment for moving said segment and an axially slidable, clutch-operating member, for moving the lever.

2. A clutch having in combinative association a flat ring clutch member; two axially movable members, one on each side thereof; a spring to normally hold said members in driving engagement; a radially movable wedge comprising a tapered plural segment ring, for moving said outer members out of driving engagement with the intermediate member, a lever for each ring segment each having a part located between the ring and the axis of the members for moving the said segments and an axially slidable, clutch-operating member, for moving the levers to disconnect the clutch-members.

3. A clutch having in combinative association a flat ring clutch member, tapered transversely to provide a thinner edge and a diametrically opposite thicker edge; another, cooperating, axially movable, tapered clutch member; a spring to normally hold said clutch members in driving relation to transmit a given load and yieldable upon excess load and means to disengage said members.

4. A clutch having in combinative association a plurality of flat ring clutch members, tapered transversely to provide thinner edges and diametrically opposite thicker edges, other co-operating, axially movable, alternately disposed, similarly tapered clutch members; a spring to normally hold said clutch members in driving relation to transmit a given load and yieldable upon excess load and means to disengage said members.

5. A clutch having in combinative association two axially movable clutch members rotatably connected together; an intermediate clutch member independently rotatable, two of said clutch members being transversely tapered; a spring to normally hold the members in driving relation, and means, slidable axially of the outer members to disconnect them from driving relation with the intermediate member, said spring permitting the thickest portions of the tapered members to pass each other.

6. A clutch having in cooperative association a plurality of clutch members rotatably connected to a shaft, and axially movable thereon, a plurality of alternate, intermediate clutch members rotatably connected to a driving wheel and axially movable thereon, a suitable number of said clutch members being transversely tapered, each to provide a thinner edge and an opposite thicker edge; a spring for normally holding said clutch members in driving relation, and means for axially moving the terminal clutch members to overcome the effect of the spring.

7. A clutch having in cooperative association a plurality of clutch members rotatably connected to a shaft and axially movable thereon; a plurality of intermediate clutch members rotatably connected to a driving wheel and axially movable thereon, a suitable number of said clutch members being transversely tapered, each to provide a thinner edge and an opposite thicker edge; a spring for normally holding the said clutch members in driving relation and a wedge between said terminal clutch members radially movable, for axially moving the terminal clutch members in opposite directions to overcome the effect of the spring and an axially slidable means for moving said wedge.

8. A clutch having in combinative association a plurality of spaced apart, axially movable, transversely tapered, rotatably connected clutch members; another series of similar members rotatable independently of the first series and alternately arranged therewith; a spring normally holding said members in driving engagement, and adjustable to carry a given load but yielding to permit the thicker edges of the two sets of clutch members to pass each other upon excess of load and means for moving the terminal members away from the series to release the intermediate members.

In testimony whereof I hereunto subscribe my name.

JOHN W. CROWLEY, Jr.